Figure 4:
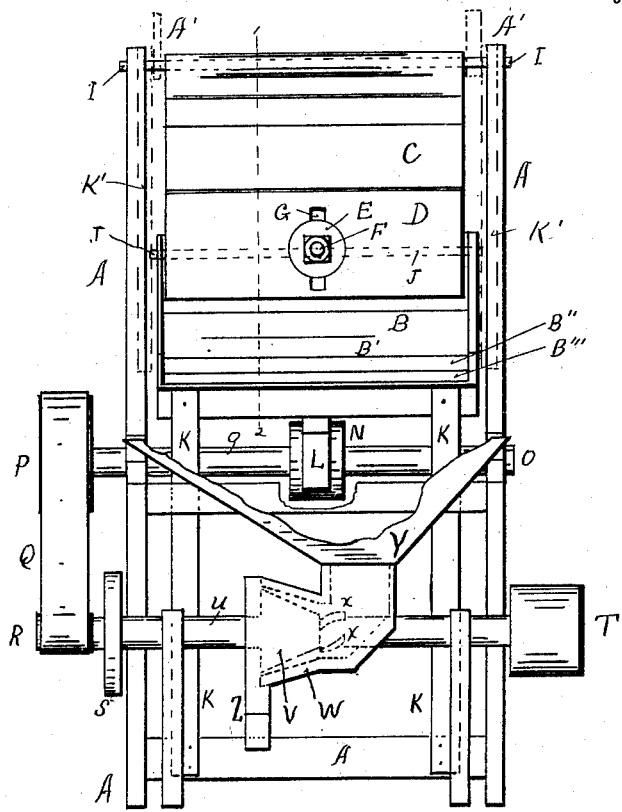

No. 719,741. PATENTED FEB. 3, 1903.
J. W. BURTON.
SEPARATOR.
APPLICATION FILED MAR. 28, 1902.
NO MODEL. 3 SHEETS—SHEET 1.
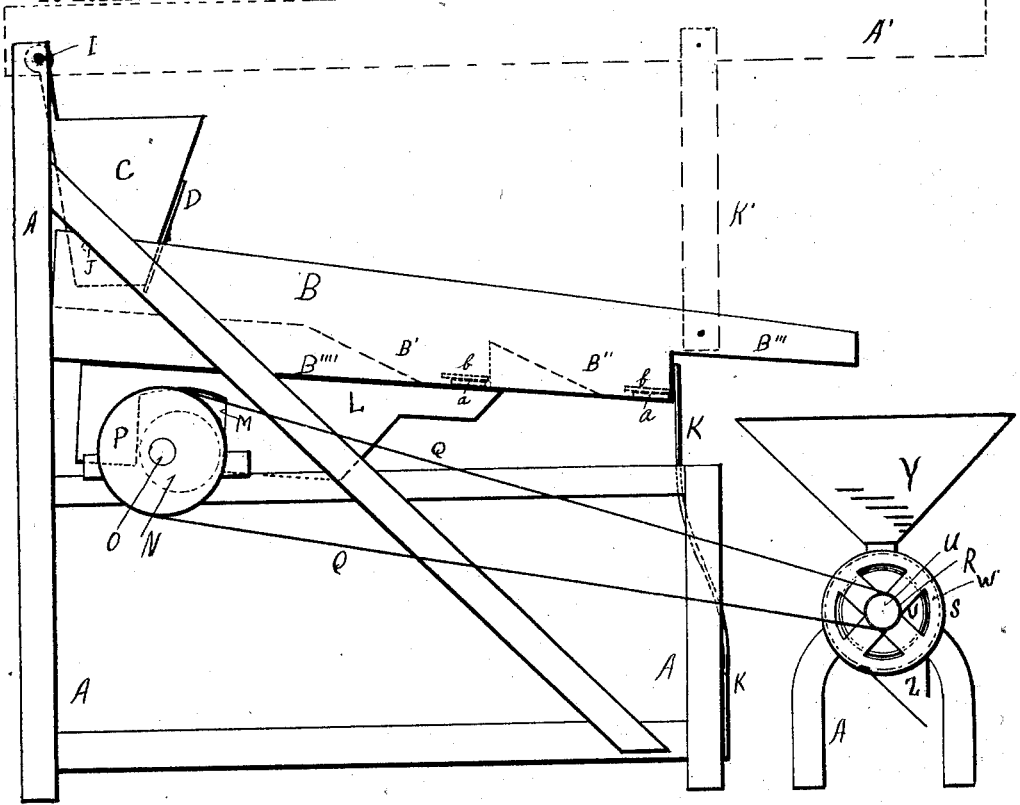
Fig. 1
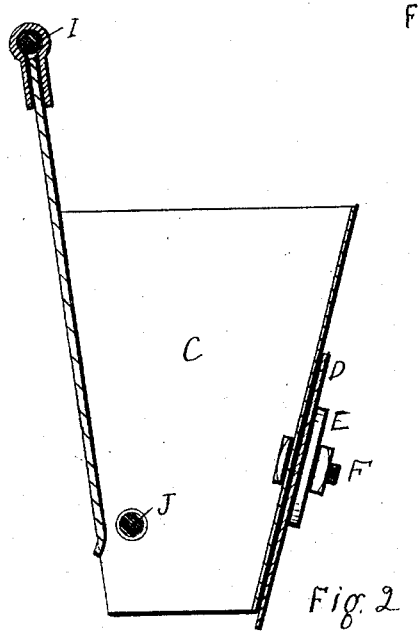
Fig. 2
Fig. 3
Witnesses:
Inventor
John W. Burton
By J. A. Rosen
Atty No. 719,741. PATENTED FEB. 3, 1903.
J. W. BURTON.
SEPARATOR.
APPLICATION FILED MAR. 28, 1902.
NO MODEL. 3 SHEETS—SHEET 2.

Witnesses
Inventor
John W. Burton
By J. A. Rosen
Atty

No. 719,741. PATENTED FEB. 3, 1903.
J. W. BURTON.
SEPARATOR.
APPLICATION FILED MAR. 28, 1902.
NO MODEL. 3 SHEETS—SHEET 3.

Witnesses
O. Rosen
B. T. Fisher

Inventor
John W. Burton
By J. A. Rosen
Atty

UNITED STATES PATENT OFFICE.

JOHN W. BURTON, OF MAPLEHILL, KANSAS.

SEPARATOR.

SPECIFICATION forming part of Letters Patent No. 719,741, dated February 3, 1903.

Application filed March 28, 1902. Serial No. 100,451. (No model.)

*To all whom it may concern:*

Be it known that I, JOHN W. BURTON, a citizen of the United States of America, residing at Maplehill, in the county of Wabaunsee and State of Kansas, have invented new and useful Improvements in Separators, of which the following is a specification.

The object of my invention is to provide a means for separating from grain before grinding for feed the iron, stone, and other hard and heavy substances which are found therein. These substances are bolts, nuts, spikes, nails, broken pieces of the harvesting machinery, &c.

My device is adapted to any kind of grain; but the construction shown is especially desirable for grinding cob-meal—that is, meal ground from the cob and kernel of corn and used as feed for live stock. In some feed-grinding machines springs are arranged to permit the passage through the grinders of these foreign substances; but it is evident that such arrangements are not efficient, for if the foreign substances pass through then unground or imperfectly-ground grain will also pass through, or if the speed of the grinders is high then the hard substances will dull or break the grinders, notwithstanding the springs. My invention takes the hard and heavy substances from the grain before it enters between the grinders, thus eliminating all risk of both breaking the grinders and permitting the passage of unground or imperfectly-ground grain. My invention also acts at the same time as an automatic feed-regulator for the grinder. To accomplish these ends, I provide the grinder with an inclined gravity-separator, by which I mean an inclined chute having pockets in its bottom and means for imparting reciprocating substantially horizontal motion thereto. This explanation of my meaning of an "inclined gravity-separator" is important in view of the frequent use of the phrase in this specification. A swinging hopper is hinged at its lower end to the upper end of the inclined chute and is provided with an adjustable feed-gate. By these devices, which are simple and economical in construction, I may replace the unsatisfactory spring arrangements and the comparatively expensive feed arrangements now used.

The details of my invention appear hereinafter and in the drawings accompanying and forming part of this specification.

Figure 5:
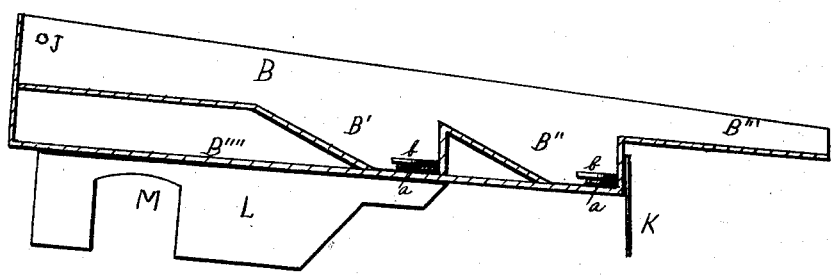
Figure 6:
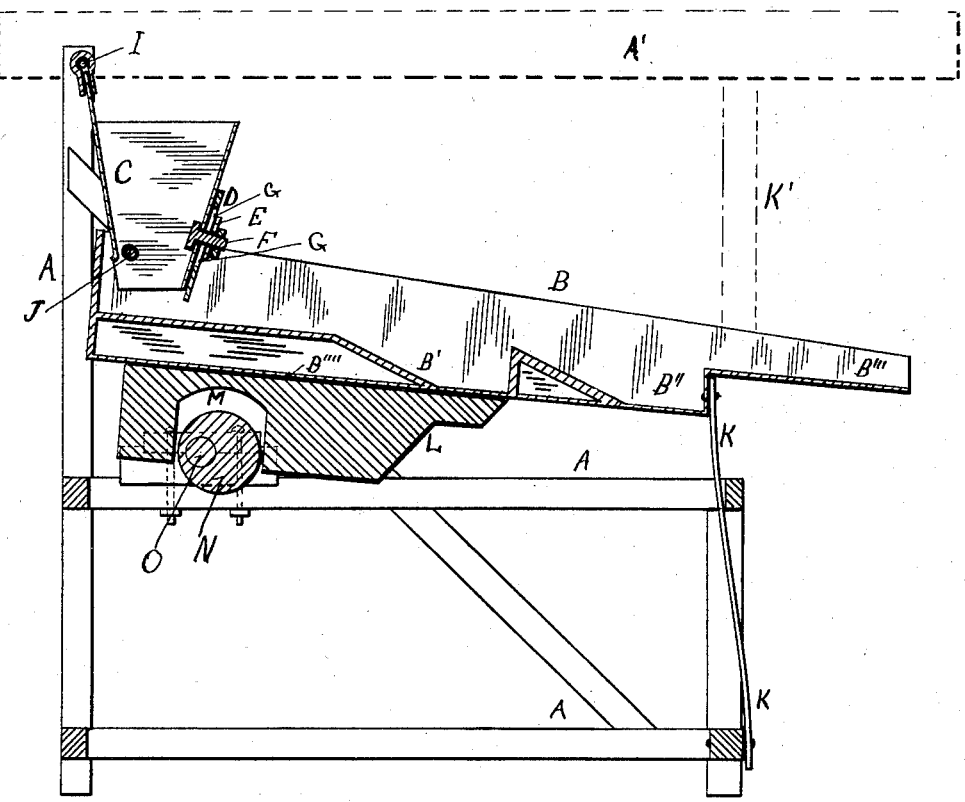

Figure 1 is a side elevation. Fig. 2 is an enlarged section through the line 1 2, Fig. 4, of the hopper. Fig. 3 is a plan view of the plate or board and magnets attached thereto which are placed in the bottoms of the pockets. Fig. 4 is a front elevation, portions of the hopper Y and front upper cross-beam of the framework being broken away to give a view of the eccentric. Fig. 5 is a section of the inclined chute through the line 1 2, Fig. 4. Fig. 6 is a longitudinal vertical central section of the separator.

Like letters refer to like parts throughout the several views.

A A is the framework.

B is the inclined chute, having the pockets B' B''. The false bottom B'''' serves no purpose in operation, but strengthens the construction. $b$ $b$ are magnets, attached to the plate or board $a$, placed in the bottom of the pockets as an additional means for drawing the metals thereinto. The chute is sustained at its lower end by the vertical springs K K and is hinged at its upper end to the swinging hopper C, which is hinged or swings on the rod I, which is attached to the framework A. By hinging the upper end of the inclined chute to the rear of the lower end of the hopper C, as by the rod J, the chute and hopper form a sort of jaw. The rods J and I are not plumb with each other; but the rod I is located in the rear of the rod J, so as to give the chute a slightly-upward movement.

Attached to the under side of the inclined chute is the block L, having the opening M, in which works the eccentric N on the shaft O, driven by the pulley P, which in turn is driven by the belt Q and pulley R on the shaft U, provided with the master-wheel S and main driving-pulley T. Although any kind or type of grinder may be used, I prefer in grinding cob-meal to use the type of grinder consisting of the conical convex runner grinder V on the shaft U and the outside shell or corresponding concave stationary grinder W, the shaft U also having the cutter-knives X X.

Y is the grinder-hopper, located under the exit end B''' of the inclined gravity-separator, and Z is the exit-chute for the finished product. If desired, the hopper C may be swung from the rafters A' A', as may also the lower end of the separator, by means of the hangers K' K', thus doing away with much of the framework.

The hopper C may be provided with an adjustable feed-gate, which may consist of the gate D, having the vertical slot G and held in place by the bolt and nut F and washer E. By this means the separator may be readily adjusted as to its feed to any size of grain or to any capacity of feed-grinder.

To operate my machine, the power is applied to the main driving-pulley T, by which, with the belt and pulleys hereinbefore mentioned, the feed-grinder and the inclined gravity-separator, as also the jaw formed by the inclined chute and the hopper C, are operated. In grinding cob-meal it is best to break the whole ear of corn before feeding it into the grinding apparatus, either by shelling or by cutting. The grain or in case of cob-meal both the ear and the kernel are fed into the hopper C, whence it passes through the jaw formed by the bottom of said hopper and said chute, the motion of the jaw preventing the hopper from becoming choked and acting at the same time as a feed-regulator. Thence the grain passes down the chute, filling the pockets, the hard and heavy substances settling to the bottom thereof, whence they may be removed from time to time. The magnets also serve to assist gravity in drawing the metals thereinto. The sharp and slightly-upward movement of the separator throws the grain along down the chute, from which it has its exit through the lower end B''', falling into the grinder-hopper Y, passing between the grinders V and W, and issuing from the chute Z as the finished product. Besides the advantage of avoiding risk of breaking the machinery it is clear that the product of my machine is free from stones or iron or like foreign substances and is ground to a uniform fineness. It is also clear that the greater the speed of the grinder the faster will be the feed through the jaw formed by the hopper C and the chute B and the faster also will the grain be thrown along down the chute B. Thus the said jaw formed by the bottom of the hopper C and the upper end of the chute B acts as a feed-regulator for the inclined gravity-separator. If the product were fed into and through the separator in too large quantities, it would fail to separate the heavy materials from the lighter, but all would be pushed along down the chute without giving the heavier particles opportunity to settle to the bottom of the pockets; but by means of the gate D the feed into the chute may be adjusted so that the product can be properly acted upon, so that not only does the jaw-feed act as a feed-regulator for the inclined gravity-separator, but both together act as a feed-regulator for the grinders.

Having thus described my invention, what I claim as new, and desire to secure by Letters Patent, is—

1. The combination of the supporting-frame, the rod I in the upper part thereof, the separator presenting an inclined surface over which the descent of the feed is assisted by gravity; means for imparting longitudinal reciprocation to said separator; the rod J; and the feed-hopper discharging near to the surface of said separator; said hopper being pivotally suspended at its upper end on the rod I, and pivoted near its lower end by rod J to the separator; whereby the hopper is caused by the movement of the separator, to oscillate and to form in connection with the surface thereof, an alternately expanding and diminishing opening for the discharge of its contents upon the separator-surface.

2. The combination of the supporting-frame, the rod I in the upper part thereof, the separator presenting an inclined surface over which the descent of the feed is assisted by gravity; means for imparting longitudinal reciprocation to said separator; the rod J in a vertical plane forward of that of rod I; and the feed-hopper discharging near to the surface of said separator; said hopper being pivotally suspended at its upper end on the rod I, and pivoted near its lower end by the rod J to the separator; whereby the hopper is caused by the movement of the separator, to oscillate and to form in connection with the surface thereof, an alternately expanding and diminishing opening for the discharge of its contents upon the separator-surface.

In testimony whereof I have affixed my signature in presence of two witnesses.

JOHN W. BURTON.

Witnesses:
Z. T. FISHER,
JOSEPH GROLL,